March 31, 1925.  1,531,727
B. BENSEN
FLUSHING VALVE AND THE LIKE
Filed Nov. 30, 1923  4 Sheets-Sheet 1

Inventor:
Bernard Bensen,
by Lanning & Lanning
Atty

March 31, 1925.
B. BENSEN
1,531,727
FLUSHING VALVE AND THE LIKE
Filed Nov. 30, 1923
4 Sheets-Sheet 2
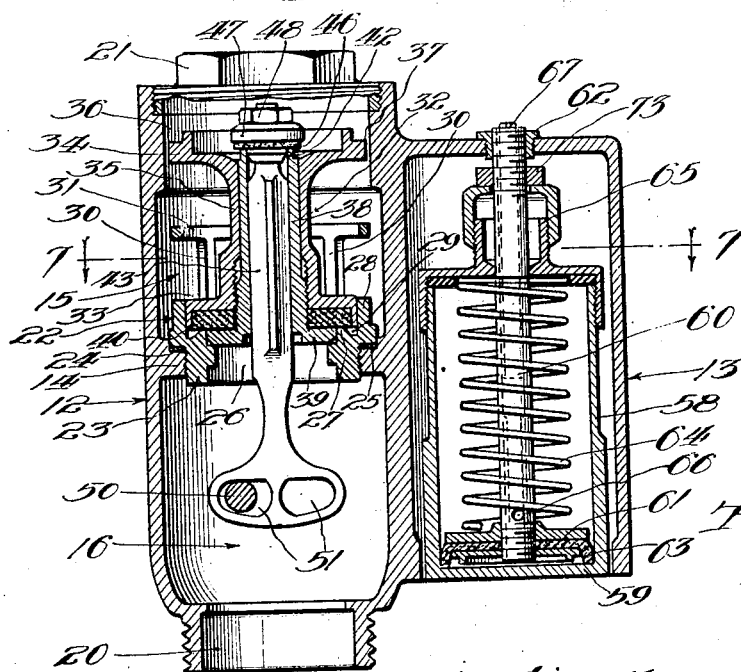
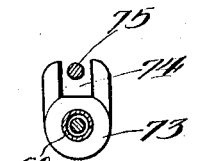
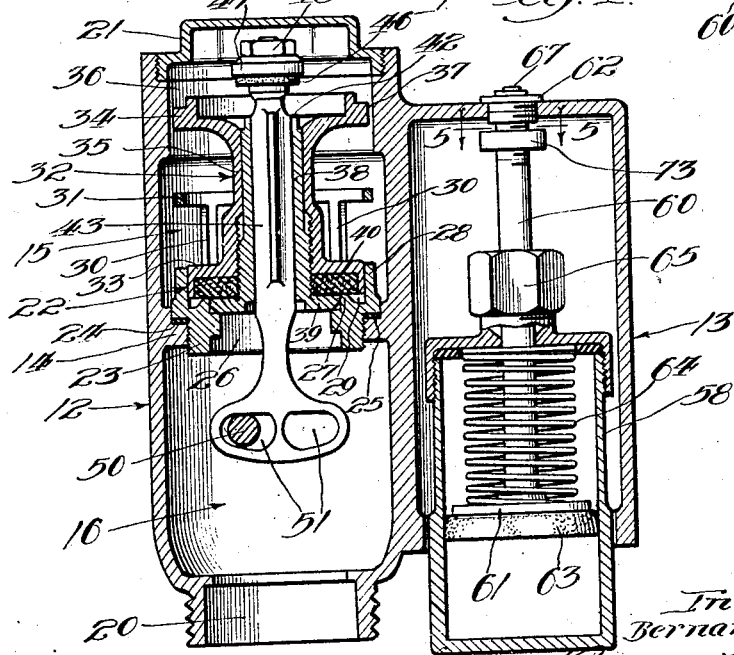
Inventor:
Bernard Bensen, March 31, 1925.  1,531,727
B. BENSEN
FLUSHING VALVE AND THE LIKE
Filed Nov. 30, 1923    4 Sheets-Sheet 3
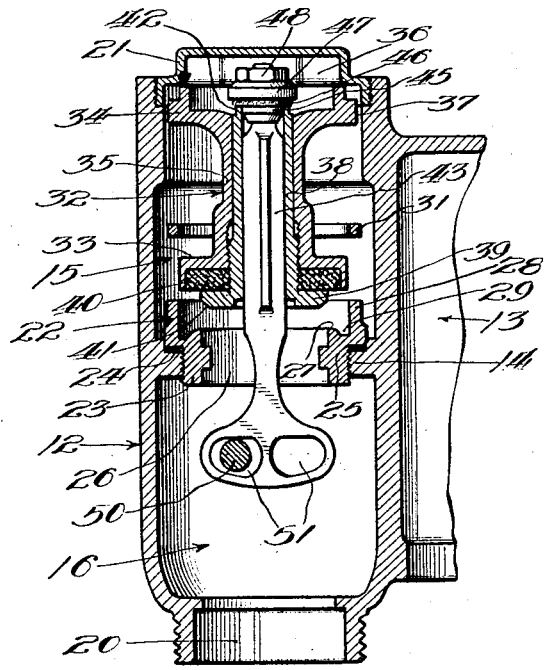
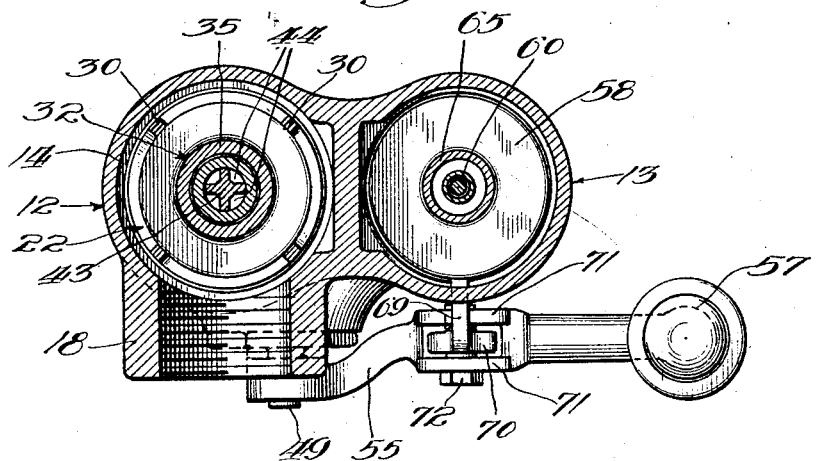
Inventor:
Bernard Bensen, March 31, 1925. 1,531,727
B. BENSEN
FLUSHING VALVE AND THE LIKE
Filed Nov. 30, 1923  4 Sheets-Sheet 4
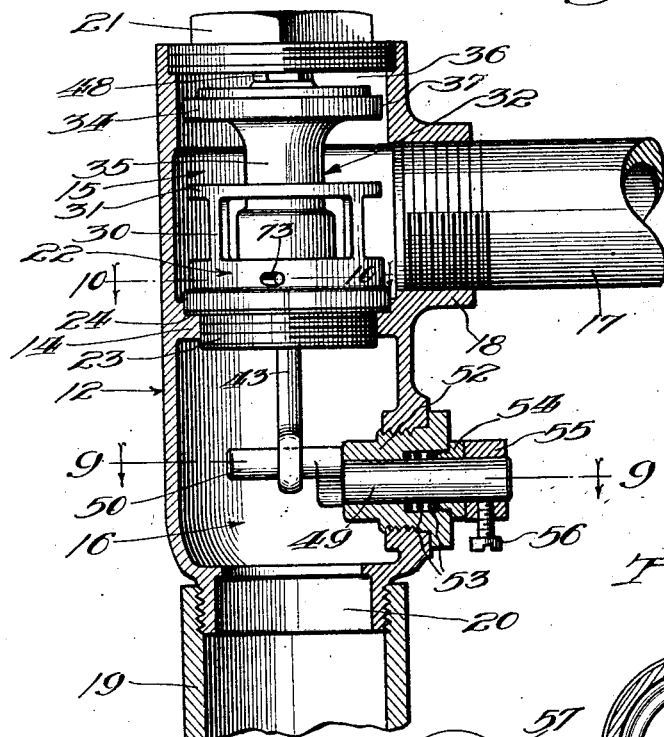
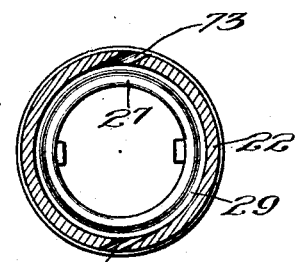
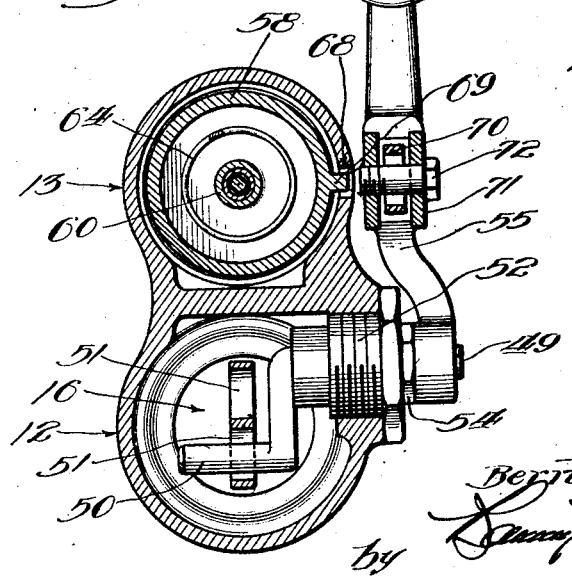
Inventor:
Bernard Bensen,
by Patented Mar. 31, 1925.

1,531,727

UNITED STATES PATENT OFFICE.

BERNARD BENSEN, OF CHICAGO, ILLINOIS, ASSIGNOR TO ROBERTS & BENSEN BRASS MFG. CO., OF CHICAGO, ILLINOIS, A COPARTNERSHIP CONSISTING OF THOMAS H. ROBERTS AND BERNARD BENSEN.

FLUSHING VALVE AND THE LIKE.

Application filed November 30, 1923. Serial No. 677,616.

*To all whom it may concern:*

Be it known that I, BERNARD BENSEN, a citizen of the United States, residing at Chicago, in the county of Cook and State of Illinois, have invented certain new and useful Improvements in Flushing Valves and the like, of which the following is a specification.

The present invention has to do with certain improvements in flushing valves and the like. It has to do with improvements in flushing valves for water closets, urinals, and other similar structures.

One of the objects of the invention is to provide a simple type of construction for automatically closing the valve after the release of the operating button. In this connection, one of the objects is to provide an arrangement for establishing the connections between the valve and the restoring spring and dash pot without the need of using links and other connections which are liable to become disarranged in service.

In connection with the foregoing, a further object is to provide a very compact arrangement, and one in which the construction of the casing for the various parts may be simplified, its size reduced, and its weight lessened with corresponding reduction in cost of manufacture.

One feature of the invention relates to the provision of an improved construction of the control valve such that the operations thereof are simplified and the amount of force necessary to be applied by the user is considerably reduced. In this connection it is a further object of the invention to provide a construction whereby the power to open the main valve is actually supplied by the water pressure itself when the supplemental valve is released by the user.

A further feature of the invention relates to the provision of an improved construction of valve seat for the main valve. In this connection, one of the objects is to provide an arrangement such that the valve seat can be very easily removed and replaced from time to time either for adjustment or displacement without the necessity of disturbing more than two or three of the remaining parts of the valve.

In this connection it is a further object to make it possible to replace the valve seat from time to time as it wears, so that the flushing valve can be kept in first class operating condition at all times and at a minimum of expense. This is an important feature when it is considered that the valve seats are generally made of brass or bronze, which is a relatively expensive material.

A further object of the invention is to make provision for a thoroughly satisfactory afterfill which is performed automatically in the latter stages of the valve closing operation. A further object in this connection is to provide for thoroughly scouring and cleaning the valve seat itself through the filling operation, so that the valve seat will be in the best possible condition when the valve is finally completely closed.

Other objects and uses of the invention will appear from a detailed description of the same, which consists in the features of construction and combinations of parts hereinafter described and claimed.

In the drawings: Figure 1 shows a side elevation of an improved flushing valve embodying the features of the present invention, and it shows by dotted lines the position of the operating button and dash pot when the valve is fully opened;

Fig. 3 is a vertical section through the structure with the parts in their normal or closed position;

Fig. 4 is a view corresponding to that of Fig. 3, with the exception that the operating button has just been duly depressed so as to lower the dash pot and raise the auxiliary valve, but the main valve has not yet opened;

Fig. 5 is a fragmentary section on the line 5—5 of Fig. 4, looking in the direction of the arrows;

Fig. 6 is a fragmentary view corresponding to Fig. 4, with the exception that the main valve has been fully lifted by the force of the water so as to fully open the valve;

Fig. 7 is a horizontal cross section taken on the line 7—7 of Fig. 3, looking in the direction of the arrows;

Fig. 8 is a view corresponding to Fig. 3, but at right angles thereto, the valve and valve seat being shown in elevation;

Fig. 9 is a horizontal section taken on the line 9—9 of Fig. 8, looking in the direction of the arrows; and Fig. 10 is a fragmentary horizontal section taken on the line 10—10 of Fig. 8, looking in the direction of the arrows.

Figure 1:
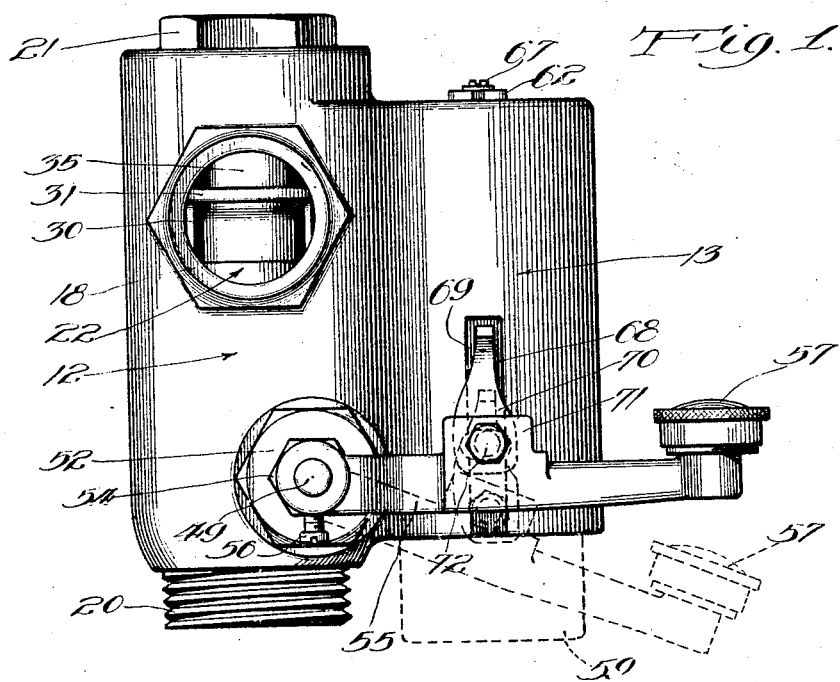
Figure 2:
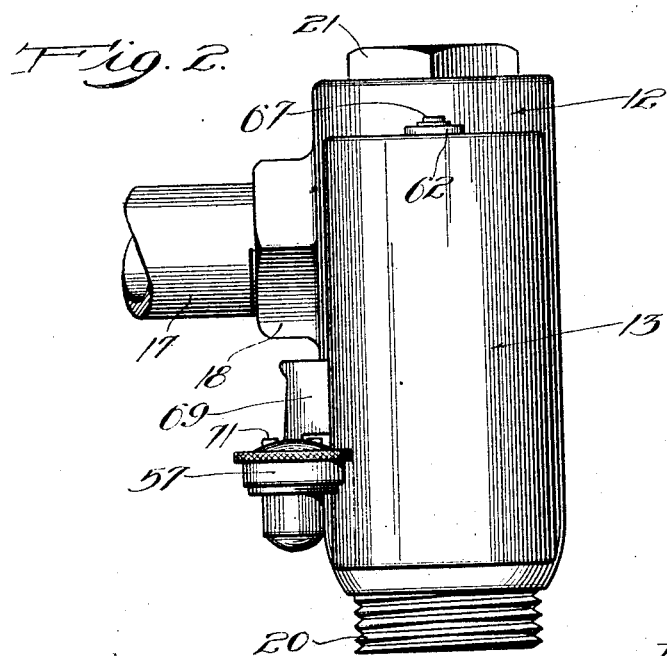
Fig. 2 is a view at right angles to that of Fig. 1.

The flushing valve comprises generally a valve chamber 12 and a dash pot chamber 13 which are conveniently formed as a unit, the two chambers being casted side by side.

The valve chamber is preferably of cylindrical form and has a horizontal ledge 14 formed around its mid interior portion. This is located between the inlet chamber 15 and the delivery chamber 16 beneath the same. The water supply connection 17 is connected into the flange 18 at one side of the chamber 16 and the water delivery connection 19 is connected to the downwardly depending neck 20 at the lower end of the delivery chamber 16.

The upper portion of the inlet chamber 15 is preferably closed by a cap or plug 21. The opening at this point is sufficiently large to allow the main valve and the valve seat or basket to be inserted or removed with facility and without disturbing the other parts.

A valve basket or valve seat member 22 is supported by the ledge 14. This basket includes a downwardly depending flange 23 which threads into the ledge and at the upper end of which is a shoulder 24. A gasket 25 may be set between the shoulder and the ledge so as to establish a thoroughly water tight connection when the basket is screwed in place.

A relatively large passage 26 reaches downwardly through the central portion of the basket, and an annular valve seat 37 is formed at the upper end of this passage. This valve seat faces upwardly and is fully exposed around its periphery by reason of the fact that the basket has the upwardly extending flange 28 which, however, is of larger size than the size of the valve seat. Preferably the basket is raised as shown at 29 between the valve seat 27 and the flange 29.

In order to effectively guide the up and down movements of the lower portion of the valve, I prefer to provide a series of opposing fingers 30 around the basket, which are separated from each other, but whose upper ends are joined together by a ring 31. The size of this basket is such that it can be set down through the opening exposed when the plug 31 and main valve are removed.

The main valve 32 has at its lower end a flange 33 and at its upper end a flange 34. These flanges are joined together by a central hollow stem 35. The flange 33 is of proper size to work easily within the flange 28 of the basket, and while not establishing an absolutely water tight connection therewith, does serve to substantially shut off the main flow of water as long as the flange 33 is seated to any extent within the flange 28.

The flange 34 is of larger size than the flange 33 and works easily within the opening 36 at the upper end of the inlet chamber 15. In fact, as clearly indicated in Fig. 3, there is a slight passage 37 allowed between the flange 34 and the upper end 36 of the chamber 15, so that the water can seep through and reach the top surface of the flange 34. In this way the hydrostatic pressure on the top and bottom faces of the flange 34 is equalized when the parts are at rest.

The total area of the top surface of the main valve member is greater than the area of the under surface of the flange 34 by an amount equal to the cross sectional area of the stem 35. Consequently, when the main valve is closed by seating against the seat 27, the downward pressure is greater than the upward pressure and the water pressure therefore serves to hold the valve in the closed condition.

Extending through the neck 35 is a sleeve 38 whose lower portion threads into the neck, and whose lower end carries a flange 39. By threading the sleeve upwardly the flange 39 clamps a gasket or washer 40 firmly in place within a recess in the lower face of the flange 33. This gasket 40 is the element which seats directly against the seat 27 when the main valve is closed. The flange 39 is, for this purpose, of somewhat smaller size than the opening of the seat 27, and the lower peripheral edge 41 of the flange 39 is preferably tapered, so that in the last stages of the seating operation, the water will be gradually cut off.

The upper end of the sleeve 38 reaches slightly above the flange 34 and establishes a secondary valve seat 42. Extending down through the hollow collar 38 is a stem 43 which is of such cross section as to establish one or more vertical passages 44 throughout its length as particularly illustrated in Fig. 7.

The upper end of the stem 43 has a flange 35 against which may be clamped a washer 46 by means of a collar 47 held in place by a nut 48 threaded onto the upper end of the stem 43. Consequently, when the stem is drawn down with respect to the main valve, the washer 46 is seated firmly against the valve seat 42 so as to close the auxiliary valve. On the other hand by raising the stem 43 with respect to the main valve, the auxiliary valve is opened so as to allow water to flow down through the passages 44, and thus relieve the pressure on the top faces of the flange 34.

In one side of the chamber 16 there is placed a rock shaft 49 whose inner end carries a crank 50 working within the chamber 16. The lower portion of the stem 42 is widened out and is provided with a pair of eyes 51, clearly shown in Figs. 3, 4 and 6, into either of which the crank 50 may be originally inserted. The rock shaft 49 passes through a collar 52 which is threaded into the side wall of the chamber 16. Suitable packing material 53 may be compressed into place around the rock shaft by a collar 54 of familiar arrangement.

On the outer end of the rock shaft 49 there is secured a lever 55 as by means of a set screw 56. The outer end of this lever carries an operating button 57 conveniently located for manipulation by the user.

Within the chamber 13 there is located a dash pot 58 which normally stands with its lower end 59 substantially on a level with the lower end of the casing 13. The piston rod 60 which extends through this dash pot carries a plunger 61 at its lower end, and the upper end of the piston is stationary with respect to the casing by means of a nut 62. The plunger 61 may be of any suitable construction, that illustrated including a cup leather 63. A spring 64 within the dash pot works against the plunger and against the top of the dash pot and thus tends to raise the dash pot into the position shown in Fig. 3. A suitable construction 65 may be provided at the upper end of the dash pot for establishing an oil still around the plunger so as to effectively prevent leakage.

The piston rod or stem 60 is hollow at its lower end and is provided with an opening 66 at a point above the plunger through which opening the oil may pass above the plunger from underneath the plunger. A needle valve within the stem serves to control the amount of opening of the passage through the lower end thereof, so that the rapidity with which the oil is transferred through this passage may be regulated. This needle valve can be conveniently adjusted from the outside of the device by turning the nut 67 which is exposed above the auxiliary chamber 13.

By reason of the construction thus described, it is possible to force the dash pot down rapidly, since the oil, at such times flows freely from the upper portion of the cylinder past the cup leather to the lower portion of the cylinder. The rate of the up stroke is restricted, however, by reason of the fact that the oil is to pass through the passage in the lower end of the stem 60 which is restricted by the needle valve and is thus regulated.

The auxiliary chamber 13 is provided with a slot 68 at one side adjacent to the position of the lever 55. The dash pot has a sidewise extension 69 which reaches through this slot and carries at its lower end a finger 70. This finger is pivoted between the upstanding flange 71 of the lever by a pin 72 with a loose connection, so that a sufficient amount of play is allowed to compensate for the angularity of movement of the pivotal point when the lever is depressed into the dotted line position of Fig. 1.

The operation of this device is substantially as follows:

Assuming that the main valve and lever and dash pot are in the initial position of Fig. 3, the main and auxiliary valves are both closed and the dash pot is in its normal position. Upon suddenly depressing the button 57 and tilting the lever into the dotted line position of Fig. 1 the shaft 49 is turned and the crank 50 is raised. This raises the stem 43 with a sudden movement, so that the auxiliary valve is suddenly opened. As soon as this happens the water above the flange 34 is allowed to flow down through the passages 44 and be discharged into the bowl, thus materially releasing the hydrostatic pressure above the flange 34. Inasmuch as the size of the flange 34 is greater than that of the flange 33 and inasmuch as both of these flanges are simultaneously exposed to the full hydrostatic pressure delivered through the pipe 17, it follows that there will be a considerable net lifting force which will raise the main valve the full distance until limited by the position of the auxiliary valve; this raising will be sufficient to fully expose the valve opening 26 so as to allow the full flushing action to take place. At the same time the auxiliary valve is closed.

The full flushing action will continue as long as the button is held in the depressed condition, and for a certain period thereafter. As soon as the button is released the spring will commence to raise the dash pot at a speed limited by the oil, and the stem 43 will be correspondingly lowered. This will gradually draw the main valve down against the hydrostatic force previously referred to until finally the flange 33 of the main valve enters the upper end of the flange 22. As soon as this takes place, the major portion of the flushing action will cease. There are, however, provided one or more openings 73 in the flange 22 at such a position as to allow a slight flow of water to continue until the main valve is finally fully seated. This will provide for the after fill. Preferably these openings 73 are formed in a direction generally tangential to the screw of the flange 22, so that the water of this after fill would exert a strong scouring action on the valve seat and thus keep it thoroughly cleaned.

It was previously mentioned that there are preferably provided two of the openings 51 in the lower end of the valve stem 43. This is done as a matter of convenience, since by so doing, the crank 50 can be easily set into whichever one of these openings is presented depending upon the position of the stem 43 when the parts are assembled.

It will be observed that in order to replace the basket and valve seat, it is only necessary to remove the cap 21 and the nut 48 from the upper end of the stem 43, whereby the main valve can be withdrawn and thus expose the basket and valve seat.

While I have herein shown and described only a single embodiment of the features of my present invention, still I do not intend to limit myself to the same, except as I may do so in the claims.

I claim:

1. In a device of the class described, the combination of a unitary housing having a pair of vertically extending chambers separated by a central vertical partition, one of said chambers being a valve chamber and the other a dash pot chamber, suitable water supply and delivery connections to the valve chamber, suitable valve mechanism within the valve chamber to control the supply of water therethrough, and including a vertically operable valve stem, the lower end of the dash pot chamber being open, a dash pot vertically movable within said chamber, a piston within the dash pot, a piston rod connected to the piston and reaching through the upper end of the dash pot, a rigid connection between the upper end of the piston rod and the roof of the dash pot chamber, there being a vertical slot in the side of the dash pot chamber, a finger on the dash pot reaching through said slot, a rock shaft journalled in the lower portion of the valve chamber and reaching to the outside thereof, an operative connection between said rock shaft and the valve stem aforesaid, an operating lever connected to the projecting end of the rock shaft, and a pin connection between said lever and the dash pot finger aforesaid whereby depression of the lever directly rocks the shaft to operate the valve stem and simultaneously depresses the dash pot, substantially as described.

2. In a device of the class described, the combination of a unitary housing having a pair of vertically extending chambers separated by a central vertical partition, one of said chambers being a valve chamber and the other a dash pot chamber, suitable water supply and delivery connections to the valve chamber, suitable valve mechanism within the valve chamber to control the supply of water therethrough and including a vertically operable valve stem, a dash pot vertically movable within the dash pot chamber, a piston within the dash pot, means for retaining said piston in fixed position, there being a vertical slot in the side of the dash pot chamber, a finger on the dash pot reaching through said slot, a rock shaft journalled in the lower portion of the valve chamber and reaching to the outside thereof, an operative connection between said rock shaft and the valve stem aforesaid, an operating lever connected to the projecting end of the rock shaft, and a pin connection between said lever and the dash pot finger aforesaid, whereby depression of the lever directly rocks the shaft to operate the valve stem and simultaneously depresses the dash pot, substantially as described.

3. In a device of the class described, the combination of a unitary housing having a pair of vertically extending chambers separated by a central vertical partition, one of said chambers being a valve chamber and the other a dash pot chamber, a suitable water supply and delivery connections to the valve chamber suitable valve mechanism within the valve chamber to control the supply of water therethrough, and including a vertically operable valve stem, a dash pot within the dash pot chamber, a companion piston within the dash pot, means for holding one of said parts in fixed position and the other being movable, there being a vertical slot in the side of the dash pot chamber, a finger on the movable element reaching through said slot, a rock shaft journalled in the lower portion of the valve chamber and reaching to the outside thereof, an operative connection between said rock shaft and the valve stem aforesaid, an operating lever connected to the projecting end of the rock shaft, and a pin connection between said lever and the finger aforesaid, whereby depression of the lever directly rocks the shaft to operate the valve stem and simultaneously depresses the movable element, substantially as described.

4. In a device of the class described, the combination of a valve chamber, a sill reaching around the interior of the same, a basket having in its lower portion a downwardly extending neck adapted to seat within said sill and having a central through passage, said basket having an upwardly facing valve seat surrounding said opening and also having a series of upwardly reaching separated guide arms located around said seat, and having an annular flange around said seat in proximity to the position of the seat, a water supply connection into the valve chamber above the position of the sill, a water delivery connection from the valve chamber at a position below the sill, a main valve vertically movable within the guide arms aforesaid and having at its lower end a valve flange adapted to seat against and close the valve seat aforesaid, said valve flange working freely within the basket flange aforesaid, there being a perforation extending through the basket flange in a substantially tangential direction, and means for operating the valve aforesaid, whereby when the valve flange is raised clear of the basket flange a full opening is presented, and whereby when the valve flange enters the basket flange the main supply of water is interrupted but an auxiliary supply is admitted through the perforation of the basket flange in a generally tangential direction to thereby flush the valve seat and provide for the after fill, substantially as described.

5. In a device of the class described, the combination of a valve chamber, a sill reaching around the interior of the same, a basket having in its lower portion suitable means for attachment to the sill and having a central through passage, said basket having an upwardly facing valve seat surrounding said opening, and an annular flange around said seat in proximity to the position of the seat, a water supply connection into the valve chamber above the position of the sill, a water delivery connection from the valve chamber at a position below the sill, a main valve vertically movable through the annular flange aforesaid and having at its lower end a valve seat flange adapted to seat against and close the valve seat aforesaid, there being a perforation extending through the basket flange, and means for operating the valve aforesaid, whereby when the valve flange is raised clear of the basket flange a full opening is presented, and whereby when the valve flange enters the basket flange the main supply of water is interrupted, substantially as described.

BERNARD BENSEN.